(12) United States Patent
Rolly et al.

(10) Patent No.: US 7,867,328 B2
(45) Date of Patent: Jan. 11, 2011

(54) INKJET INK COMPOSITIONS AND METHODS OF MAKING THE SAME

(75) Inventors: Luanne J. Rolly, Corvallis, OR (US); Tom Etheridge, Corvallis, OR (US); Sven Moller, Munich (DE); Garry Hinch, Salem, OR (US); Gregory Herman, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 11/649,979

(22) Filed: Jan. 5, 2007

(65) Prior Publication Data

US 2008/0165235 A1 Jul. 10, 2008

(51) Int. Cl.
*C09D 11/02* (2006.01)
*G01D 11/00* (2006.01)

(52) U.S. Cl. .................... 106/31.9; 347/100; 106/31.86

(58) Field of Classification Search ................. 106/31.9; 347/100
See application file for complete search history.

(56) References Cited

U.S. PATENT DOCUMENTS

| 6,020,397 | A | 2/2000 | Matzinger |
| 6,106,110 | A | 8/2000 | Gundjian et al. |
| 6,149,719 | A | 11/2000 | Houle |
| 6,417,249 | B1* | 7/2002 | Nguyen et al. ............... 523/201 |
| 6,555,168 | B2 | 4/2003 | Chen et al. |
| 6,576,155 | B1* | 6/2003 | Barbera-Guillem .... 252/301.36 |
| 6,835,326 | B2 | 12/2004 | Barbera-Guillem |
| 6,905,538 | B2 | 6/2005 | Auslander |
| 2002/0149656 | A1* | 10/2002 | Nohr et al. ..................... 347/95 |
| 2002/0154567 | A1 | 10/2002 | Husher |
| 2004/0233465 | A1 | 11/2004 | Coyle et al. |
| 2004/0247861 | A1 | 12/2004 | Naasani |
| 2005/0061199 | A1 | 3/2005 | Tsuda et al. |
| 2006/0088713 | A1* | 4/2006 | Dykstra et al. ............... 428/402 |
| 2006/0148932 | A1* | 7/2006 | Nohr et al. .................. 523/201 |
| 2006/0155376 | A1* | 7/2006 | Asgari ..................... 623/16.11 |

OTHER PUBLICATIONS

Pradhan et al., "An Alternative of CdSe Nanocrystal Emitters: Pure and Tunable Impurity Emissions in ZnSe Nanocrystals", J. Am. Chem. Soc. 2005, 127, pp. 17586-17587.

* cited by examiner

*Primary Examiner*—Jessica L Ward
*Assistant Examiner*—Veronica Faison Gee

(57) ABSTRACT

An inkjet ink composition includes water and effective amounts of one or more of: derivatized 2-pyrrolidinones; glycerol polyoxyethyl ethers; diols; or combinations thereof. The inkjet ink composition also includes an effective amount of functionalized nanocrystals.

9 Claims, No Drawings

INKJET INK COMPOSITIONS AND METHODS OF MAKING THE SAME

BACKGROUND

The present disclosure relates generally to inkjet ink compositions and methods of making the same.

Functionalized nanocrystals are often supplied in suspensions with, for example, toluene, chloroform, or water, which may not be readily compatible with commonly available thermal inkjet printing techniques. Such suspensions may be suitable for specialized printing devices, including a thermal inkjet pico-fluidic system, which are designed to substantially avoid material incompatibility and/or fluid and printhead architecture incompatibility. Such specialized printing devices may, in some instances, be undesirable for printing graphical indicia, textual indicia, or the like. Piezoelectric inkjet printing techniques may be suitable for printing the suspensions, however, the spitting that is generally needed to keep the nozzles primed may result in excessive waste.

DETAILED DESCRIPTION

Embodiments of the inkjet ink composition disclosed herein are suitable for being printed using drop-on-demand (including thermal inkjet technology and piezoelectric inkjet technology) or continuous inkjet technology. The inkjet ink composition(s) may advantageously be printed using thermal and piezoelectric inkjet pens and printers, which enables substantial printing flexibility. It is to be understood that embodiments of the ink compositions and systems disclosed herein generally do not require specialized printing devices and/or specialized printheads that are often associated with other inks containing functionalized nanocrystals.

Furthermore, the inkjet ink composition disclosed herein may be formulated to be excited and/or interrogated by appropriate means. As such, embodiments of the inkjet ink composition may be suitable for producing printed indicia that are also identifying or authenticating marks. As used herein, the term "interrogated" refers to probing the printed indicia in some manner. As a non-limiting example, optical interrogation (exposing the indicia to light of a predetermined wavelength and measuring the response at another wavelength) may be used to measure the fluorescence spectrum, phosphorescence spectrum and/or lifetime, Raman spectrum, absorption spectrum, or other luminescence spectrum. As another non-limiting example, metal or metal oxide nanoparticles present in the printed indicia may be interrogated magnetically.

As used herein, the singular forms of the articles "a," "an," and "the" include plural referents unless the content clearly dictates otherwise. Further, the phrase "effective amount," as used herein, refers to the minimal amount of a substance and/or agent, which is sufficient to achieve a desired and/or required effect. For example, an effective amount of an "ink vehicle" is the minimum amount required in order to create an ink composition, while maintaining properties suitable for effective inkjet printing.

One embodiment of the inkjet ink composition includes water, effective amounts of solvents including one or more of: derivatized 2-pyrrolidinones, glycerol polyoxyethyl ethers, diols, or combinations thereof, and an effective amount of functionalized nanocrystals. Another embodiment of the inkjet ink composition includes an ink vehicle and an effective amount of functionalized nanocrystals having a transition metal chalcogenide core and a group IIB chalcogenide shell.

"Liquid vehicle" or "ink vehicle," as used herein, refers to the vehicle in which the functionalized nanocrystals are placed to form the ink. In an embodiment, the ink vehicle includes water and effective amounts of one or more of: derivatized 2-pyrrolidinone(s), glycerol polyoxyethyl ether(s), diol(s), or combinations thereof. In one non-limiting example, the ink vehicle includes water and a derivatized 2-pyrrolidinone (e.g., 1-(2-hydroxyethyl)-2-pyrrolidinone). In another non-limiting example, the ink vehicle includes derivatized 2-pyrrolidinone(s), glycerol polyoxyethyl ether(s), diol(s), and non-ionic and/or anionic surfactants. The ink vehicle may also include water soluble polymers, buffers, biocides, sequestering agents, viscosity modifiers, surface-active agents, chelating agents, pH adjusting agents, resins, and/or combinations thereof.

In an embodiment, the derivatized 2-pyrrolidinone(s) is/are selected from N-methyl-2-pyrrolidinone, 1-(2-hydroxyethyl)-2-pyrrolidinone, 4-hydroxy-2-pyrrolidinone, 5-(hydroxymethyl)-2-pyrrolidinone, 1,5-dimethyl-2-pyrrolidinone, 1-(hydroxymethyl)-2-pyrrolidinone, 3,3,5-trimethyl-2-pyrrolidinone, 5-methyl-2-pyrrolidinone, or combinations thereof. Generally, the effective amount of derivatized 2-pyrrolidinone(s) is equal to or less than about 15 wt. %. Without being bound to any theory, it is believed that the derivatized 2-pyrrolidinones are useful for forming a good drive bubble, while also serving as humectants.

The effective amount of glycerol polyoxyethyl ethers (LEG) ranges from about 0.5 wt. % to about 6 wt. %. Non-limiting examples of suitable glycerol polyoxyethyl ethers include ethoxylated glycerins, such as Liponic® EG-1 (LEG-1) and Liponic® EG-7 (LEG-7) (both of which are commercially available from Lipo Chemicals, Inc, Paterson, N.J.).

Non-limiting examples of diols include ethanediols (e.g., 1,2-ethanediol), propanediols (e.g., 1,2-propanediol, 1,3-propanediol, 2-ethyl-2-hydroxy-methyl-1,3-propanediol, ethylhydroxy-propanediol (EHPD), etc.), butanediols (e.g., 1,3-butanediol, 1,4-butanediol, etc.), pentanediols (e.g., 1,5-pentanediol), hexanediols (e.g., 1,6-hexanediol, 2,5-hexanediol, etc.), and/or combinations thereof. In an embodiment, the effective amount of the diol(s) is equal to or less than about 16 wt. %. A non-limiting example of a mixture of diols suitable for the inkjet ink composition includes from about 4 wt. % to about 6 wt. % 2-methyl-1,3-propanediol and from about 0.5 wt. % to about 2 wt. % 1,2-hexanediol. Without being bound to any theory, it is believed that the diol(s) serve as quasi-surfactants and aid in enhancing decap performance.

The term "decap," as referred to herein, means the ability of the inkjet ink to readily eject from the print head, upon prolonged exposure to air. The ink decap time is measured as the amount of time that an ink printhead may be left uncapped before the printer nozzles no longer fire properly, potentially because of clogging or plugging. Generally, the nozzle(s) may become clogged/plugged by a viscous plug that forms in the nozzle(s) as a result of water loss, crusting of the ink, and/or crystallization of the dye in and/or around any of the nozzles. If a nozzle has plugged, ink droplets ejected through the nozzle's orifice may be misdirected, which may adversely affect print quality. The orifice may also become completely blocked, and as a result, the ink droplets may not pass through the affected nozzle. As previously stated, it is believed that the diol(s) in the inkjet ink composition are useful for enhancing decap.

An embodiment of the inkjet ink composition includes an effective amount of functionalized nanocrystals. Generally, from about 0.01 wt. % to about 10 wt. % of the functionalized nanocrystals may be present in the composition. In a nonlimitative example, about 0.2 wt. % of the functionalized nanocrystals is included in the composition.

It is to be understood that any suitable functionalized nanocrystals may be selected. Non-limiting examples of such nanocrystals include semi-conductor nanocrystals, metal nanocrystals, metal oxide nanocrystals, metal halide nanocrystals, transition metal chalcogenides, group IIB chalcogenides, core/shell structures thereof, and/or combinations thereof. In an embodiment, the semi-conductor nanocrystals are selected from CdSe, CdS, CdTe, InP, InGaP, InN, GaN, and/or combinations thereof. In another embodiment, the metal nanocrystals are selected from Au, Ag, Cu, Pd, Pt, and/or combinations thereof. In still another embodiment, the metal oxide nanocrystals are selected from $SiO_2$, $TiO_2$, $Y_2O_3$, $LaPO_4$, $Fe_2O_3$, ZnO, CuO, PtO, $PtO_2$, and/or combinations thereof. In still another embodiment, the metal halide nanocrystals are selected from $NaYF_4$, BaFBr, $PbI_2$, and/or combinations thereof. In still another embodiment, the transition metal chalcogenides are selected from MnSe, CuSe, CoSe, and/or the like, and/or combinations thereof. In another embodiment, these nanocrystals may be doped with luminescent cations, primarily metal cations that are selected from Tb, Er, Yb, and Eu. It is to be understood that the examples of the functionalized nanocrystals are non-limiting, and that other suitable functionalized nanocrystals are considered to be within the purview of the present disclosure. Any of the functionalized nanocrystals may have a core-shell structure, where the core is the previously described composition, and the shell is a compatible semiconductor material formed from a group IIB element and an appropriate chalcogen (group VIA element) (e.g., CdS, ZnS, CdSe, ZnSe, and/or combinations thereof), or a silica coating (e.g., surface enhanced Raman spectroscopy (SERS) nanotags, which are commercially available from Oxonica, Inc., Mountain View, Calif.).

Embodiments of the inkjet ink composition may also include one or more surfactants. Generally, any non-ionic, anionic or amphoteric surfactant is suitable for the inkjet ink composition. Examples of suitable surfactants include, but are not limited to Dowfax® 8390, Dowfax® 2A1, Triton® X-100, Tergitol® 15-S-5 (all of which are commercially available from The Dow Chemical Company, Midland, Mich.), Mackam® OCT-50 (which is commercially available from Mcintyre Group, Ltd., University Park, Ill.), Surfynol® 131 (which is commercially available from Air Products and Chemicals, Inc., Allentown, Pa.), and/or the like, and/or combinations thereof.

Generally, water makes up a balance of the inkjet ink composition.

It is to be understood that the pH of the inkjet ink composition may also be adjusted to any desirable pH. In an embodiment, the pH is adjusted so that it ranges anywhere from about 3 to about 11. As a non-limiting example, the inkjet ink composition has a pH of about 9. Any suitable pH adjusting agent may be used to obtain a desirable ink pH. Non-limiting examples of pH adjusting agents include 3-(N-Morpholino)-propanesulfonic acid (MOPS), tris(hydroxyethyl)aminoethane (TRIS), N-Cyclohexyl-2-aminoethanesulfonic acid (CHES), and/or combinations thereof.

In a non-limiting example embodiment, the inkjet ink composition includes about 6 wt. % 2-pyrrolidinone(s), about 5 wt. % glycerol polyoxyethyl ether(s), and about 6 wt. % diols (e.g., about 5 wt. % 2-methyl-1,3-propanediol and about 1 wt. % 1,2-hexanediol). This non-limiting example embodiment also includes about 83 wt. % water and about 2.0 mg/ml ink of CdSe/Zn/S nanocrystals.

In another non-limiting example embodiment, the inkjet ink composition includes about 14 wt. % 1-(2-hydroxyethyl)-2-pyrrolidone, about 86 wt. % water, and about 0.4 mg/ml ink of CdSe/Zn/S nanocrystals.

Making embodiment(s) of the inkjet ink composition includes providing or forming the ink vehicle (e.g., solvents and/or co-solvent(s) and water), and adding the effective amount of functionalized nanocrystals thereto.

In an embodiment of a method for using embodiment(s) of the inkjet ink composition, the ink composition is established on at least a portion of a substrate to form an image. The amount of the ink composition established depends, at least in part, on the desirable image to be formed. The image may include alphanumeric indicia, graphical indicia, or combinations thereof.

The image formed using embodiments of the inkjet ink compositions may be excited at predetermined wavelengths, interrogated at predetermined wavelengths, and/or interrogated by other means (e.g., magnetically). Generally, the excitation range of the printed ink ranges from about 200 nm to about 900 nm, and the interrogation range of the printed ink ranges from about 210 nm to about 1500 nm. It is to be understood, however, that the ink composition is generally formulated such that the wavelengths for excitation and interrogation for the ink composition are different. As a non-limiting example, the inkjet ink composition may be formulated so that the functionalized nanocrystals are excited in a range of about 200 nm to about 300 nm, and are interrogated in a range of about 560 nm to about 600 nm. The excitation and interrogation wavelengths for the ink composition are dependent, at least in part, upon the nanocrystal(s) selected for the ink composition.

Non-limiting examples of suitable inkjet printing techniques include thermal inkjet printing, piezoelectric inkjet printing, or continuous inkjet printing. Suitable printers include portable thermal or piezoelectric inkjet printers (e.g., handheld printers, arm mountable printers, wrist mountable printers, etc.), desktop thermal or piezoelectric inkjet printers, large-scale or commercial thermal or piezoelectric inkjet printers, continuous inkjet printers, or combinations thereof.

It is to be understood that embodiment(s) of the inkjet ink composition disclosed herein may be printed on any suitable substrate. Non-limiting examples of such substrate materials include, but are not limited to non-absorbent substrates, plain papers, microporous photopapers, coated papers, glossy photopapers, semi-gloss photopapers, heavy weight matte papers, billboard papers, digital fine art papers, calendared papers, vinyl papers, engineered substrates (e.g., synthetic printing sheets, for example, Teslin®, which is commercially available from PPG Industries, Pittsburgh, Pa.), or combinations thereof.

While several embodiments have been described in detail, it will be apparent to those skilled in the art that the disclosed embodiments may be modified. Therefore, the foregoing description is to be considered exemplary rather than limiting.

What is claimed is:

1. An inkjet ink composition, comprising:
   an ink vehicle consisting essentially of:
      up to 16 wt %. of 1,2-hexanediol or 1,5-pentanediol; and
      a balance of water; and
   from about 0.01 wt. % to about 10 wt. % of transition metal chalcogenide/group IIB chalcogenide core shell functionalized nanocrystals.

2. The inkjet ink composition as defined in claim 1 wherein the transition metal chalcogenide/group IIB chalcogenide core shell functionalized nanocrystals are CdSe:ZnS quantum dots.

3. The inkjet ink composition as defined in claim 1 wherein an image printed with the inkjet ink composition is: i) excitable at wavelengths ranging from about 200 nm to about 900 nm, ii) interrogatable at wavelengths ranging from about 210 nm to about 1500 nm, or iii) combinations thereof.

4. The inkjet ink composition as defined in claim 1, further comprising one or more surfactants.

5. A printing system, comprising:
   a printer; and
   an inkjet ink configured to be printed, via the printer, on a substrate, the inkjet ink including:
   an ink vehicle consisting essentially of:
      up to 16 wt %. of 1,2-hexanediol or 1,5-pentanediol; and
      water; and
   from about 0.01 wt. % to about 10 wt. % of transition metal chalcogenide/group IIB chalcogenide core shell functionalized nanocrystals.

6. The system as defined in claim 5 wherein the printer is selected from portable thermal inkjet printers, desktop thermal inkjet printers, portable piezoelectric inkjet printers, desktop piezoelectric inkjet printers, large-scale thermal inkjet printers, large-scale piezoelectric inkjet printers, continuous inkjet printers and combinations thereof.

7. The system as defined in claim 5 wherein the inkjet ink further comprises one or more surfactants.

8. A method of making an inkjet ink composition, comprising:
   forming an ink vehicle consisting essentially of water and up to 16 wt %. of 1,2-hexanediol or 1,5-pentanediol; and
   adding from about 0.01 wt. % to about 10 wt. % of transition metal chalcogenide/group IIB chalcogenide core shell functionalized nanocrystals to the ink vehicle.

9. The method as defined in claim 8, further comprising adding one or more surfactants to the ink vehicle.

* * * * *

UNITED STATES PATENT AND TRADEMARK OFFICE
CERTIFICATE OF CORRECTION

PATENT NO. : 7,867,328 B2  
APPLICATION NO. : 11/649979  
DATED : January 11, 2011  
INVENTOR(S) : Luanne J. Rolly et al.

Page 1 of 1

It is certified that error appears in the above-identified patent and that said Letters Patent is hereby corrected as shown below:

In column 4, Claim 1, line 63, delete "wt %." and insert -- wt. % --, therefor.

In column 5, Claim 5, line 17, delete "wt %." and insert -- wt. % --, therefor.

In column 6, Claim 8, line 13, delete "wt %." and insert -- wt. % --, therefor.

Signed and Sealed this  
Eighteenth Day of October, 2011

David J. Kappos  
*Director of the United States Patent and Trademark Office*